Patented Apr. 4, 1939

2,153,515

UNITED STATES PATENT OFFICE 2,153,515

PROCESSES OF PREPARING PIGMENT IN ORGANIC VEHICLE COMPOSITIONS USEFUL FOR MAKING COATING COMPOSITIONS

Roy R. Denslow, Nutley, Archibald M. Erskine, Chatham, and Samuel C. Horning, Newark, N. J., assignors to E. I. du Pont de Nemours & Company, Wilmington, Del., a corporation of Delaware No Drawing. Application July 22, 1936, Serial No. 91,962

5 Claims. (Cl. 134—58)

The present invention relates to processes in which a pigment suspended in an aqueous medium is transferred into an organic vehicle whereby compositions are obtained which are useful for making coating compositions. The invention comprises particularly treating mixtures comprising separate phases of an organic, liquid vehicle and an aqueous dispersion of the pigment by mechanical means involving hydraulic shearing action, and in some instances, simultaneous impact disintegration. We have found that under such conditions, the pigment is deflocculated and migrates from the aqueous phase into the organic vehicle phase without formation of a stable water-oil emulsion and the process results in a product consisting of a vehicle-pigment phase which separates from the water phase, leaving the latter substantially free from pigment particles.

Production of pigment in oil dispersion directly from pigment in water dispersion has previously been achieved by either one of two methods, which involve various operations.

In one method, a water-wet pigment press cake is mixed or kneaded with the oil vehicle and a protective colloid, sometimes called "transfer assistant," such as a soap, alkali, etc., added, and occasionally the mixture was put under reduced pressure. With thorough kneading the major part of the transfer of the pigment from the water phase to the oil occurs, and the bulk of the water can be poured away from the pigment-oil system. The second operation then involves a final treatment in a roller mill or other type of mill commonly used in the paint and ink industries, by which the residual water is separated by the combined effects of mechanical treatment and evaporation. This type of process is commonly referred to as "flushing."

More recently, processes have been developed for the manufacture of pigment-oil mixtures from water pastes which make use of oil emulsions. The general procedure of such "emulsion treatment method" may be separated into steps as follows: (a) emulsification of the vehicle in water by well-known methods and use of an emulsifying agent or protective colloid best suited for the particular vehicle; (b) addition of this separately prepared emulsion to the suspension of finely divided pigment in water; (c) breaking of the oil emulsion in the presence of the pigment by addition of a suitable electrolyte; (d) separation of the pigment oil mixture from the water layer by filtration or decantation.

Our invention, on the contrary, attains the same objectives by a very much simpler procedure, which differs from such method in several important respects. Stated in briefest terms, our method involves a simple addition of the oil, or organic vehicle, without emulsification, and preferably without the use of a dispersing, transfer assisting agent or protective colloid to the water suspension of the pigment. The mere mechanical mixture is then passed through an apparatus in which it is submitted to a hydraulic shearing action. The product emerging from this apparatus separates into a pigment-vehicle and a water layer which are readily separated by conventional methods.

A simple mixing of an aqueous suspension of the pigment and an organic vehicle such as is obtained in ordinary mixing tanks, even when equipped with high speed agitators, does not ordinarily result in such a migration of the pigment from the water into the vehicle phase.

The hydraulic shearing action can most readily be obtained in machines in which, due to hydraulic forces, a film of liquid is sheared under pressure like a solid, the particles in line of shear becoming sheared. Mechanically such machines can broadly be characterized in that one surface is moved at great speed against another surface in close proximity thereof, and such types of machines are sometimes refered to as "colloid mills," or better "dispersion mills."

Hydraulic shearing actions, which will produce the desired results according to the present invention, are usually obtained in such mills when the peripheral speed of the rotor is not less than 1000 feet per minute with clearances between rotor and stator not exceeding 3/100 of an inch at such low speeds. Colloid mills usually operate at speeds of 1000 to 5000 revolutions per minute and clearances of 0.03 to 0.003 inch.

Some types of dispersion mills provide for an impact disintegration besides the hydraulic shearing action. Such types of mills have usually the rotor or the stator, or both, with corrugated or rough surfaces.

One special type of mill useful in our invention more particularly combines hydraulic shearing action and impact disintegration. Mills of such function are designed along the lines of hammer mills and are known under the trade designation "Mikropulverizers."

We realize that colloid or dispersion mills will produce dispersion, but they produce stable emulsions only in the presence of protective colloids; in our novel process the dispersions obtained are such that the water phase and oil-pigment phase readily separate, whereas prior methods of transferring pigments from water suspensions into oil suspensions always involved the use of deflocculating agents to separate the emulsions formed.

The details of the process of this invention may be described as follows:

The pigment suspension in water may be in the form of a washed or partially washed slurry, or it may be re-slurried press cake, or even press cake itself may be used directly, if it is thin enough to go through the colloid mill. The desired quantity of oil is added to the pigment-water suspension, no special mixing or high speed agitating equipment being required. The only purpose of this step is to have the oil roughly mixed with the pigment suspension. Usually the simplest procedure is to pour the oil into the vat containing the pigment suspension.

The mixture of pigment, water and oil is then run directly through the colloid mill one or more times to effect the transfer and intimate incorporation. Obviously, the pigment suspension and the oil can be run simultaneously in separate streams into the colloid mill without prior mixing. The mixture emerging from the colloid mill now contains the pigment intimately associated with the oil as a separate phase from the water; in other words, the pigment has been completely transferred from the water to the oil phase. The water is then readily separated from the pigment-oil mixture by filtration.

For certain uses it may be desirable to remove the last traces of the residual water from the pigment-oil cake after filtration. In such cases, the pigment-oil cake may be subjected to the usual oven drying process, provided no undesirable change in the oil occurs, such as oxidation, polymerization, etc. The dry cake in the case of ink-type systems is then run over an ink-mill which mashes the mixture down to a typical "flushed color." In other cases, for example, lacquers and enamels, the dry pigment-oil cake is mixed in a simple manner with other ingredients to form the finished commercial products desired. In cases where small quantities of moisture may not be undesirable in the final product, the pigment-oil press cake wet with water may be run directly over an ink-mill or similar equipment, by which most of the remaining water separates out as in the usual "flushing" processes. In such cases, the elimination of the drying step gives a further simplification in procedure.

The concentration of pigment in the water suspension is not a factor in our method, the only limit being the ability of the colloid mill to handle the material. The ratio of pigment to oil is likewise not critical. A wide variety of ratios may be used from a minimum of oil which gives final products that are substantially dry pigments with little or no oiliness to the touch up to a maximum of oil in the case of products which may be considered as inks or paints.

As "oils" for treating purposes in this process we mean all types of oily materials which constitute the vehicles of various pigment-oil systems as ordinarily manufactured; more specifically, such "oils" will include animal, vegetable and mineral oils, natural and synthetic resins, waxes, and plasticizers. In general, these are oily, fatty and waxy materials which are liquid or semi-liquid under ordinary conditions, or which can be readily liquefied. Typical of these "oils" are linseed oil and its various modifications, such as lithographic varnish, castor oil, hydrocarbon oils, etc., which form all or part of the vehicles in pigmented compositions used in the paint, enamel, pyroxylin lacquer, printing ink, rubber, linoleum and similar fields.

We have found that the colloid mill is particularly adapted to carry out the process of this invention, but other types of apparatus which give similar hydraulic shearing action with the same high efficiencies of transfer as colloid mills may be used, such as high speed pulverizers, etc.

Our novel process is applicable to the various pigments used in the arts of coating compositions. It is particularly useful for such pigments which do not react with paint vehicles constituted of glycerides of fatty acids where the pigment cannot react with the free fatty acid contained in the oil to form soaps. Very amenable to our novel process are the colored lakes, pigments and toners derived from azo, triphenylmethane, anthraquinone vat dyes, etc. As a matter of fact, all organic pigments can successfully be treated by our novel process.

It is, however, not limited to such organic pigments and inorganic colored pigments such as iron blues, chrome yellows and oranges, chrome greens have successfully been transferred from water suspensions into dispersions in oils by our novel process. Zinc sulfid, lithopones, $TiO_2$ and other neutral inorganic pigments which are difficultly wetted by paint vehicles when submitted to our novel mechanical process will also readily migrate from a water into an oil phase and thereby directly produce useful suspensions.

The following examples will describe in sufficient detail several operations conducted according to our invention:

In these examples the colloid mill provided for a peripheral speed of the rotor greater than 1000 linear feet per minute and the clearance between rotor and stator was not more than 0.03 inch.

Example I

A phosphotungstic acid lake (or toner) of Victoria Pure Blue BO dyestuff was precipitated in the usual way and washed once by decantation in the vat. An amount of #0 lithographic varnish equal to the total dry weight of pigment was added to a small portion of the slurry and stirred for ten minutes. This mixture was then added to the bulk of the slurry, stirred for ten minutes, run through a colloid mill and thence to a filter press where it was washed substantially free of soluble salts. After drying at 140° F. the lump was passed twice over a three-roll mill to give a smooth ink. Using 117 lbs. of varnish and an amount of slurry containing 117 lbs. of pigment, 234 lbs. of ink were obtained which was superior in strength to one made by grinding the corresponding dry pigment with an equal proportion of varnish.

Example II

An iron blue of the Milori type, as commonly used for printing ink, was press-washed until substantially free from soluble salts, and 250 lbs. (dry bases) was mixed with water to give a slurry of approximately 10% solids content. Two-hundred fifty pounds of "heavy ink oil" was added to about 30 gallons of the pigment slurry, stirred for ten minutes, and the mixture was then added to the bulk of the blue slurry. After stirring an additional ten minutes, the mixture was run twice through a colloid mill and then to a filter press to remove the bulk of the water. No further washing was required. After drying at 140° F., the lump was passed twice over a three-roll mill, the rolls being set medium-loose. A 50% ink of excellent strength, substantially free from grit and readily miscible with other printing ink vehicles was obtained.

Example III

A slurry containing 25 lbs. (dry basis) of washed Chinese Blue was run to a tank equipped with the usual type of agitation. The solid content was in the neighborhood of 5% by weight, but this is not essential. Seventeen pounds of dibutyl phthalate and 5 lbs. of blown castor oil were stirred together in a separate container for about 5 minutes after which approximately 7 gallons of the blue slurry was added and the stirring continued for 15 minutes more. The resulting mixture was added to the bulk of the slurry and the whole stirred for 15 minutes until fairly uniform. It was then passed twice through a colloid mill and thence to a filter press in which it was freed from the bulk of the water but not washed.

After drying at 140° F., a substantially dry product was obtained which could be dispersed directly with pyroxylin to make a lacquer mill base. The final lacquer enamel produced from the latter was characterized by high gloss, excellent color and substantial freedom from pigment grit.

Example IV

A slurry containing 460 lbs. of extended chrome green was run to a mechanically agitated vat. Eighty-four pounds of raw castor oil was stirred with about 7 gallons of this slurry, and the mixture then added to the bulk of the green suspension. After stirring 15 minutes, the whole was passed twice through a colloid mill and thence to a filter press. No washing was necessary. After drying at 140° the resulting lump could be used as such or broken down to a paste by passing over a three-roll mill. The material was especially suited for use in coloring pyroxylin coated fabrics.

Example V

A partially washed slurry of Lithol Red toner was treated with lithographic varnish in an amount equal to the weight of dry pigment in the manner described in Example I. The pigment-oil mixture thus obtained was identical in properties with the usual Lithol Red "flushed color" and was adaptable to all the uses to which the latter is put.

Example VI

To a lithopone slurry in the stage prior to final filtration, with a solids content of about 35% and containing 50 lbs. of pigment, is added 25 lbs. of #0 lithographic varnish. After stirring, the mixture is passed through a colloid mill and filtered. No washing is necessary. The cake is freed from the residual water by drying at 140° F. and the pigment-oil mixture passed over a three-roll ink mill to a smooth paste. Alternatively, the residual water may be removed from the pigment-oil mixture by passing over a three-roll mill without prior drying. The water separates readily from the pigment-oil mixture by the latter procedure. Seventy-five pounds of paste is obtained.

We claim:

1. In a process of preparing a suspension of a pigment in a water insoluble organic vehicle of an oily nature from a mixture comprising as separate phases a suspension of said pigment in an aqueous vehicle and said liquid organic vehicle, the step of submitting said mixture to a hydraulic shearing action obtained by passing said mixture between two surfaces in close proximity in which one of said surfaces moves in respect to the other surface at at least 1000 feet per minute and a clearance between said surface is not greater than 0.03 of an inch, whereby the particles of said pigment migrate from the water phase into the organic vehicle phase in the absence of agents to assist the transfer.

2. In a process of preparing a suspension of a pigment in a water insoluble organic vehicle of an oily nature from a mixture comprising as separate phases a suspension of said pigment in an aqueous medium and a liquid organic vehicle, the step of passing said mixture through a colloid mill in the absence of agents to assist the transfer.

3. The process of claim 1 in which the pigment is a member selected from the class consisting of phosphotungstic acid lakes of basic dyestuff, iron blues, and azo pigments.

4. The process of claim 1 in which the vehicle is a member selected from the class consisting of lithographic varnish, mixtures of dibutyl phthalate and castor-oil, and raw castor-oil.

5. In a process of preparing a suspension of a phosphotungstic acid lake of a basic dyestuff in a lithographic varnish from a mixture comprising as separate phases a suspension of said pigment in an aqueous medium and a lithographic varnish, the step of submitting said mixture to a hydraulic shearing action obtained by passing said mixture between two surfaces in close proximity in which one of said surfaces moves in respect to the other surface at at least 1000 feet per minute and the clearance between said surfaces is not greater than 0.03 of an inch, in the absence of agents to assist the transfer.

ROY R. DENSLOW.
ARCHIBALD M. ERSKINE.
SAMUEL C. HORNING.